United States Patent [19]

Blöckl

[11] Patent Number: 5,053,937
[45] Date of Patent: Oct. 1, 1991

[54] METHOD FOR CONTROLLING PUSH-PULL SERIES-RESONANT CONVERTER SWITCHING POWER SUPPLIES WITH REGULATED OUTPUT VOLTAGE

[75] Inventor: Reinhard Blöckl, Unterhaching, Fed. Rep. of Germany

[73] Assignee: Siemens Aktiengesellschaft, Munich, Fed. Rep. of Germany

[21] Appl. No.: 596,245

[22] Filed: Oct. 12, 1990

[30] Foreign Application Priority Data

Oct. 12, 1989 [EP]  European Pat. Off. ........ 89118997.9

[51] Int. Cl.$^5$ ............................................ H02M 3/337
[52] U.S. Cl. ........................................ 363/16; 363/17; 363/80; 363/97
[58] Field of Search ................ 363/16, 17, 80, 97, 363/98

[56] References Cited

U.S. PATENT DOCUMENTS

| | | | |
|---|---|---|---|
| 4,353,112 | 10/1982 | Rietveld | 363/16 |
| 4,692,851 | 9/1987 | Attwood | 363/16 |
| 4,896,255 | 1/1990 | Schlenk et al. | 363/97 |
| 4,933,605 | 6/1990 | Quazi et al. | 315/224 |

Primary Examiner—William H. Beha, Jr.
Attorney, Agent, or Firm—Herbert L. Lerner; Laurence A. Greenberg

[57] ABSTRACT

A push-pull series resonant converter switching power supply includes an inductive transformer with a primary winding and at least one secondary winding. Two semiconductor switches are interconnected at a circuit node and connected in a half-bridge circuit between an input potential and an input ground potential. A series-resonant circuit connected between the connecting node and the input ground potential includes a capacitor and an inductor connected in series with the primary winding of the transformer. Diodes are connected between the input potential and the input ground potential for preventing a potential at the capacitor from significantly exceeding the input potential. An output is connected to the secondary winding of the transformer for supplying an output voltage. A control circuit triggers the two semiconductor switches with turn-on pulses for regulating the output voltage to a constant value as a function of a load to be connected to the output by variation of a turn-on pulse repetition rate. A method for controlling the push-pull series resonant converter switching power supply includes controlling a maximum allowable repetition rate of the turn-on pulses and the duration of the turn-on pulses as a function of the input potential.

5 Claims, 3 Drawing Sheets

METHOD FOR CONTROLLING PUSH-PULL SERIES-RESONANT CONVERTER SWITCHING POWER SUPPLIES WITH REGULATED OUTPUT VOLTAGE

The invention relates to a method for controlling push-pull series-resonant converter switching power supplies with regulated output voltage, having an inductive transformer with a primary winding and at least one secondary winding, two semiconductor switches connected in a half-bridge circuit between an input potential and an input ground potential, a series-resonant circuit being connected between a connecting node of the semiconductor switches and the input ground potential and including a capacitor and an inductor connected in series with the primary winding of the transformer, diodes preventing a potential at a terminal of the capacitor not being acted upon by the input potential or the input ground potential from significantly exceeding or dropping below the respective input potential or the input ground potential, a rectifier connected to the secondary side of the transformer for rectifying the secondary voltage of the transformer and for supplying an output voltage at an output of the rectifier between an output terminal and an output ground terminal, a smoothing capacitor connected between the output terminal and the output ground terminal for connecting a load thereto in parallel, and a control circuit for triggering the two semiconductor switches with turn-on pulses, in such a way that the output voltage is regulated to a constant value as a function of the load by variation of the turn-on pulse repetition rate.

Among other sources, U.S. Pat. Nos. 3,596,165; 4,464,709; and 4,535,399; published European Application No. 0 293 874 A2; and instruction manuals of Unitrode Integrated Circuit Corporation for its components UC1860 and UC3860, disclose resonant converter switching power supplies. In such switching power supplies, the switching transistors are switched on and off largely without power, that is either at a negligibly low current (zero current switch) or a negligibly low voltage (zero voltage switch). The advantage of both methods is that switching is performed without power and thus a switching frequency that is higher by approximately one order of magnitude than in other switching power supplies, can be attained. Zero current switch circuits are suitable for the wide load range, but the charge of the parasitic capacitances in their semiconductor switches must be reversed, which among other effects limits the maximum possible switching frequency.

U.S Pat. Nos. 3,596,165 and 4,464,709 both show self-oscillating resonant converter switching power supplies which operate by the push-pull principle, and in which the oscillation is interrupted in each case as a function of the zero crossover. At the zero crossover, the two line switching transistors are not switched over, but instead are merely switched off. The frequency of the trigger signals of the switching transistors is not synchronized with the natural frequency of the resonant circuit, and only the operating point of the resonant circuit is displaced from the resonant point for regulating the output voltage, so that the resonant circuit is operated as a function of the input voltage and of the load above or below its resonant frequency, as applicable.

Such switching power supplies operate, for instance, according to the half-wave principle. In other words, the primary current after each half wave remains at zero for a predetermined period of time. No zero crossover detection is provided. In order to prevent a first transistor from being switched on before the second one is switched off, the second transistor may be blocked, for instance, by a monostable multivibrator, when the first transistor is switched on. The blocking time provided by the monostable multivibrator must be at least as long as the longest duration of a primary current half wave occurring in the least favorable case, which is predominantly determined by the allowable deviations in the load, the supply voltage and the transformer. The maximum switching frequency is set by the monostable multivibrator. In such circuits, the utilization factor of the various power components of the switching power supply and its efficiency are relatively low.

U.S. Pat. No. 4,535,399 shows a resonant converter switching power supply operating according to the push-pull principle, in which the regulation of the output voltage is accomplished through the combination of a PLL regulating circuit, which is matched to the zero crossovers of the load current, according to the principle of pulse-width modulation. The trigger frequency and the frequency of the resonant circuit are synchronized through the PLL regulating circuit. The resonant circuit is operated above its natural frequency. In order to synchronize these two frequencies, the primary current of the converter is supplied through a limiting stage of the PLL circuit. The output voltage is regulated through the regulator, which operates by the principle of pulse width modulation. The duty cycle of the two power transistors is directly dependent on the output load or input voltage of the resonant converter. As a result, switching off can only be performed in a narrow load or input voltage range at the zero crossover of the current, and this forces the switching of the resonant circuit.

Published European Application No. 0 293 874 A2 shows resonant converter switching power supplies with a regulating method in which the trigger frequency is adapted to the particular natural frequency as a function of the secondary load. To this end, through the use of a zero crossover detector, the zero crossover of the primary current is detected, and this actual zero crossover is utilized as a criterion for switching the switching transistors on and off. As a result, the maximum switching frequency is no longer dependent on the half-wave form of the primary current that is established under least favorable conditions of input voltage and load conditions, so that the utilization factor of the components in such switching power supplies is greater than in the switching power supplies described earlier herein.

Among other references, U.S. Pat. No. 4,727,469 to Kammiller discloses a regulated push-pull series-resonant converter switching power supply for methods of the generic type discussed above. Kammiller describes a switching power supply having a control circuit with two power switches in a half-bridge configuration, the connecting node of which is connected to a ground potential through a series circuit including the primary winding of a transformer, an inductive resistor, and a capacitor. Two suitably switched clamping diodes prevent the voltage across the aforementioned capacitor from significantly exceeding or dropping below the respective upper or lower supply potential. The secondary side of the transformer is connected through a 2-way or full-wave rectifier to a smoothing capacitor, to which a load can be connected in parallel. Through the use of a control loop, the secondary voltage is kept constant by variation of the trigger pulse clock frequency, which is controlled through a VCO. The zero crossover of the current is detected by a zero crossover detector, and the duration of each trigger pulse is controlled as a function of the zero crossover of the current, in dependence on the output voltage of the switching power supply.

The current pulse duration in the resonant circuit and thus in the primary winding of the transformer generally depends on the effective inductance and the effective capacitance of the resonant circuit, on the quality of the resonant circuit, on the winding ratio of the transformer, on the secondary voltage, which is typically regulated to a constant value, and on the magnitude of the unregulated input voltage. If the period of time from the switching on of a current in the resonant circuit through a trigger pulse until the zero passage of the current is called the "natural current pulse duration", then the natural current pulse duration with a low input voltage is shorter than with a high input voltage. In the normal load range, or in other words when a load-dependent regulation keeps the secondary voltage at a constant value, the natural current pulse duration is typically dependent on the input voltage.

In order to optimize the use of the power-dependent components in a resonant converter switching power supply as far as possible, the highest trigger pulse repetition rate is required if the input voltage is at the lowest allowable level, because the highest possible pulse repetition rate must be used during operation.

A current zero crossover detector of the kind used in Kammiller makes it possible to regulate the duration of the trigger pulses, and to regulate the repetition rate of the trigger pulses as a function of the input voltage through the VCO.

However, a current zero crossover detector requires a current converter, among other elements, and typically it cannot be monolithically integrated, for instance because it includes an inductive resistor or a Hall sensor. Since the progress of monolithic integration technology has led to the price and size of a resonant converter switching power supply to be definitively set by the non-integratable components such as the transformer, it is worth while attempting to keep the number and complexity of such components to a minimum.

German Published, Non-Prosecuted Application DE-OS 25 30 631 discloses switching power supplies with a constant working frequency, in which the regulating rise, that is predetermined by the maximum load and minimum input voltage, is set by a clock generator, and either an auxiliary frequency converter or an RC element vary the maximum regulating rise as a function of the input voltage, through a logic circuit.

The switching power supplies known from German Published, Non-Prosecuted Application DE-OS 25 30 631 work with a constant operating frequency. In other words, they are not resonant converter switching power supplies of the zero current type. A regulating circuit regulates the output voltage as a function of both the input voltage and the output load. At the lowest allowable input voltage and the largest allowable output load, the maximum possible regulating rise is required. In order to prevent saturation of the transformer of the switching power supply at a higher input voltage and at a high load, the regulating rise in such known switching power supplies is limited with increasing input voltage.

In switching power supplies lacking a zero crossover current detector, the maximum trigger pulse repetition rate is predetermined, for instance, by a monostable multivibrator control. In this case the maximum repetition rate is set by the natural current pulse duration at the maximum allowable input voltage. As a result, at a relatively low input voltage, such circuits operate with an unfavorable utilization factor of the power components such as transformers and power switches. This disadvantage is all the more problematic, as the allowable input voltage range becomes wider.

The 1986 publication by Unitrode Corporation, of Lexington, Mass., entitled "Unitrode Switching Regulated Power Supply Design Seminar Manual" particularly Chapter 5, pp. 5-1 through 5-12 and pp. 5A-1 through 5A-3, describes the principle of push-pull series-resonant converter switching power supplies. Among other features, it shows a basic circuit diagram, which is reproduced herein in FIG. 1, and the current course in the resonant circuit, which is likewise reproduced herein in FIG. 2. Instructions on dimensioning are also disclosed, and a trigger circuit is shown that furnishes constant duty cycles with a corresponding reservation for the maximum input voltage, as described in the preceding paragraph.

It is accordingly an object of the invention to provide a method for controlling push-pull series-resonant converter switching power supplies with a regulated output voltage, which overcomes the hereinafore-mentioned disadvantages of the heretofore-known methods of this general type, in which no zero crossover current detector is required and yet which enables a good utilization factor of the power components even at a relatively low input voltage.

With the foregoing and other objects in view there is provided, in accordance with the invention, a method for controlling a push-pull series resonant converter switching power supply including an inductive transformer with a primary winding and at least one secondary winding, two semiconductor switches being interconnected at a circuit node and connected in a half-bridge circuit between an input potential and an input ground potential, a series-resonant circuit connected between the connecting node and the input ground potential including a capacitor with terminals and an inductor connected in series with the primary winding of the transformer, diodes connected between the input potential and the input ground potential for preventing a potential at one of the terminals of the capacitor not being acted upon by the input potential or the input ground potential from significantly exceeding or dropping below the respective input potential or the input ground potential, a rectifier connected to the secondary side of the transformer for rectifying a secondary voltage of the transformer, the rectifier having an output supplying an output voltage between an output terminal and an output ground terminal, a smoothing capacitor connected between the output terminal and the output ground terminal to be connected in parallel to a load, and a control circuit triggering the two semiconductor switches with turn-on pulses for regulating the output voltage to a constant value as a function of the load by variation of a turn-on pulse repetition rate, which comprises controlling a maximum allowable repetition rate of the turn-on pulses and the duration of the turn-on pulses as a function of the input potential.

In generic methods for controlling push-pull series-resonant converter switching power supplies, the turn-on pulse repetition rate for the power switch is predetermined by a load-dependent regulating circuit.

In accordance with another mode of the invention, through a control circuit, for instance, which may include a regulating circuit, the duration of the turn-on pulses is controlled in accordance with the invention as a function of the input voltage and moreover, the limit value of the maximum allowable repetition rate of turn-on pulses controlling the semiconductor switches is defined as a function of the input voltage.

In accordance with a further mode of the invention, for the sake of the highest possible utilization factor, the duration of the turn-on pulses at a minimum allowable input voltage is set in such a way that it is as accurately as possible equivalent to the natural current pulse duration at this minimum allowable input voltage, and moreover the maximum allowable repetition rate of the turn-on pulses at the minimum allowable input voltage is set in such a way that the period of time between two turn-on pulses is set only by the natural current pulse duration at this input voltage and by a very short idle time, this idle time being dependent on the switching behavior of the semiconductor switches used and being disposed in such a way that the two semiconductor switches disposed in the half-bridge circuit are certain not to conduct quite simultaneously.

In accordance with a concomitant mode of the invention, due to the greater feasibility, a control circuit for performing the method according to the invention can be constructed in such a way that the duration of the turn-on pulses and the maximum allowable repetition rate of the turn-on pulses is optimally adapted, only at the minimum allowable input voltage, to the natural current pulse duration of that voltage, and that the duration of the turn-on pulses and the maximum allowable repetition rate of the turn-on pulses at a greater input voltage is varied as a function of this greater input voltage in such a manner that they are greater than would be necessary from the natural current pulse duration at this input voltage, but are greater than at a minimum allowable input voltage by at most a factor that is formed by the square of the ratio of the actual input voltage to the minimum allowable input voltage.

Other features which are considered as characteristic for the invention are set forth in the appended claims.

Although the invention is illustrated and described herein as embodied in a method for controlling push-pull series-resonant converter switching power supplies with a regulated output voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
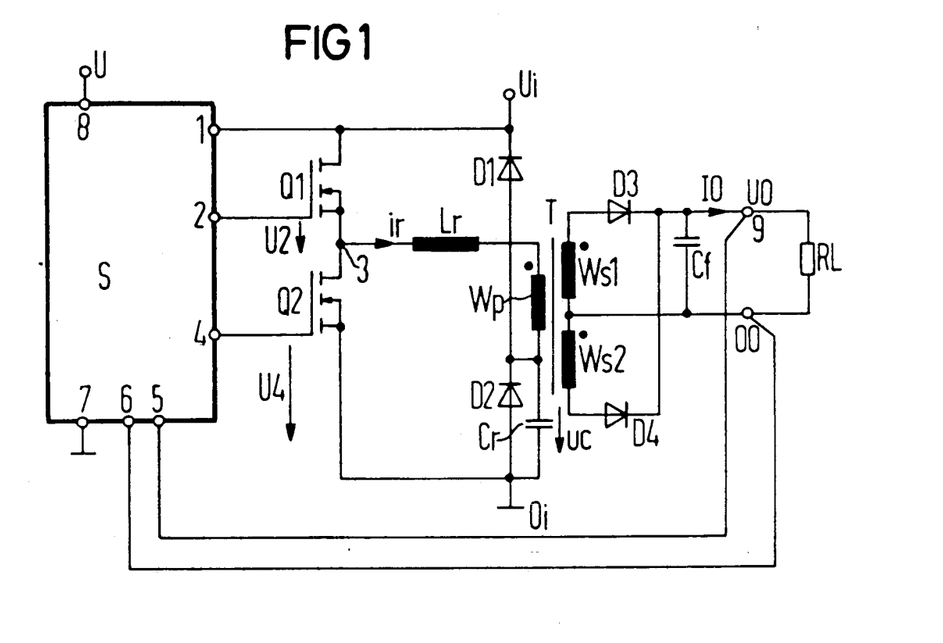
FIG. 1 is a basic schematic and block circuit diagram of one possible embodiment of a resonant converter switching power supply of a generic type with a control unit S, illustrating the principle of generic resonant converter switching power supplies as it is described in the Unitrode publication mentioned above.

Referring now in detail to the figures of the drawings while making reference to the laws of physics and first, particularly, to FIG. 1 thereof, there is seen a resonant converter switching power supply with a series-resonant circuit being formed of a capacitor Cr having one terminal connected to an input ground potential Oi and another terminal being connected to one terminal of a primary winding Wp of a transformer T. The other terminal of the capacitor Cr is also connected to the anode of a first recovery diode D1 having a cathode connected to an input potential Ui as well as to the cathode of a second recovery diode D2 having an anode connected to the input ground potential Oi. The other terminal of the primary winding Wp is connected through an inductor or inductive resistor Lr to a circuit node 3. The circuit node 3 can be connected to the input potential Ui through a first semiconductor switch Q1 and to the input ground potential Oi through a second semiconductor switch Q2. A secondary winding Ws1, Ws2 of the transformer is provided with a center pickup or tap, which forms the output ground terminal OO. End pickups or taps of the secondary winding Ws1, Ws2 are each connected through a respective rectifier diode D3, D4 to an output terminal 9. A smoothing capacitor Cf is connected, and a load RL can be connected, between the output terminal 9 and the output ground terminal OO. An output voltage UO is furnished at the terminal 9. A control circuit S, which is shown as a block, has the following terminals, among others: a connection terminal 8 for connection of a supply potential U; a connection terminal 7 for the ground potential Oi; connection terminals 5 and 6 for supplying the output voltage UO; an output terminal 2 for furnishing a signal U2 between the output terminal 2 and the node 3, which is provided for triggering the first semiconductor switch Q1; and an output terminal 4 for furnishing a signal U4 between the output terminal 4 and the input ground potential Oi, which is provided for triggering the second semiconductor switch Q2. The inductor Lr represents the effective inductance in the resonant circuit. This inductance also includes the stray inductance and parasitic inductances. Accordingly, an additional coil is not absolutely necessary to make the inductor Lr, if the transformer T is suitably constructed. The capacitor Cr likewise includes all of the capacitances effective in the series-resonant circuit as its effective capacitance.

In order to avoid so-called edge losses, the conducting time of the semiconductor switches Q1 and Q2 should be controlled in such a way that they switch off no earlier than when the current flow in the applicable semiconductor switch and thus in the resonant circuit has become zero. On the other hand, these two semiconductor switches Q1 and Q2 must not conduct simultaneously.

In such circuits, as is known from the aforementioned publication by Unitrode, the current ir in the resonant circuit Lr, Cr has a sine-wave course and is dependent on the effective inductance of the inductor Lr, on the effective capacitance of the capacitor Cr, on the ratio of the inductance of Lr to the capacitance of Cr, on the quality factor (Q-factor) of the resonant circuit, on the winding ratio n of the transformer T, on the input voltage Ui, Oi, which is formed from the difference between the input potential Ui and the input ground potential Oi, and on the output voltage Uo. If the input voltage Ui, Oi is high enough that one of the recovery diodes D1 or D2 becomes conducting, then the current ir in the resonant circuit flows largely linearly (as can also be learned from the aforementioned company publication) and is then only dependent on the inductance of Lr, the output voltage UO, and the winding ratio n of the transformer T. In a generic resonant converter switching power supply, the effective inductance of Lr, the effective capacitance of Cr and thus the Q-factor of the resonant circuit and the winding ratio n of the transformer T are constant variables. Since the output voltage UO is smoothed by a smoothing capacitor Cf and kept constant through a regulating circuit, it is only the input voltage between the input potential Ui and the input ground potential Oi that is a variable.

Figure 2A:
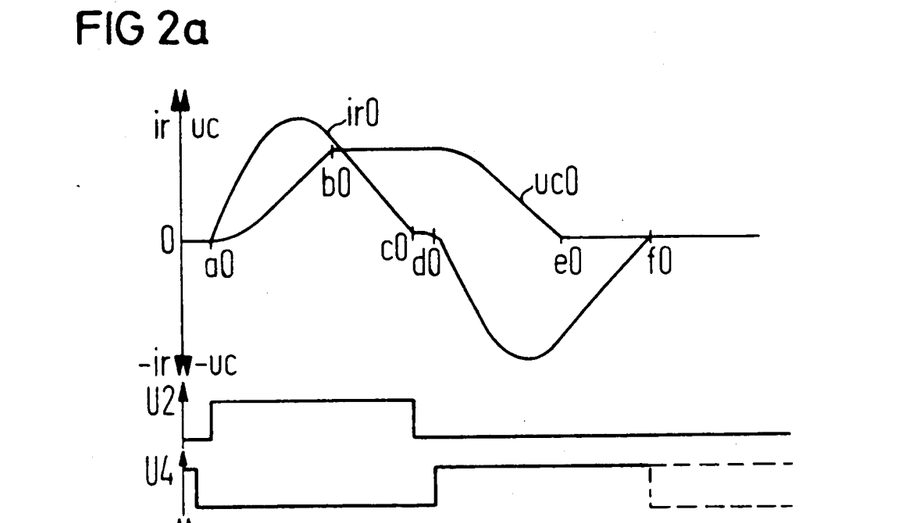
FIGS. 2a, 2b and 2c are a set of graphs of a current ir in a primary winding of the resonant converter of FIG. 1, and a voltage uc across a capacitor Cr of the series-resonant circuit of FIG. 1, which is plotted over time as a function of an input voltage Ui, Oi, and trigger voltages U2 and U4 that are necessary for the corresponding current voltage courses of the semiconductor switches disposed in a half-bridge circuit.
Figure 2B:
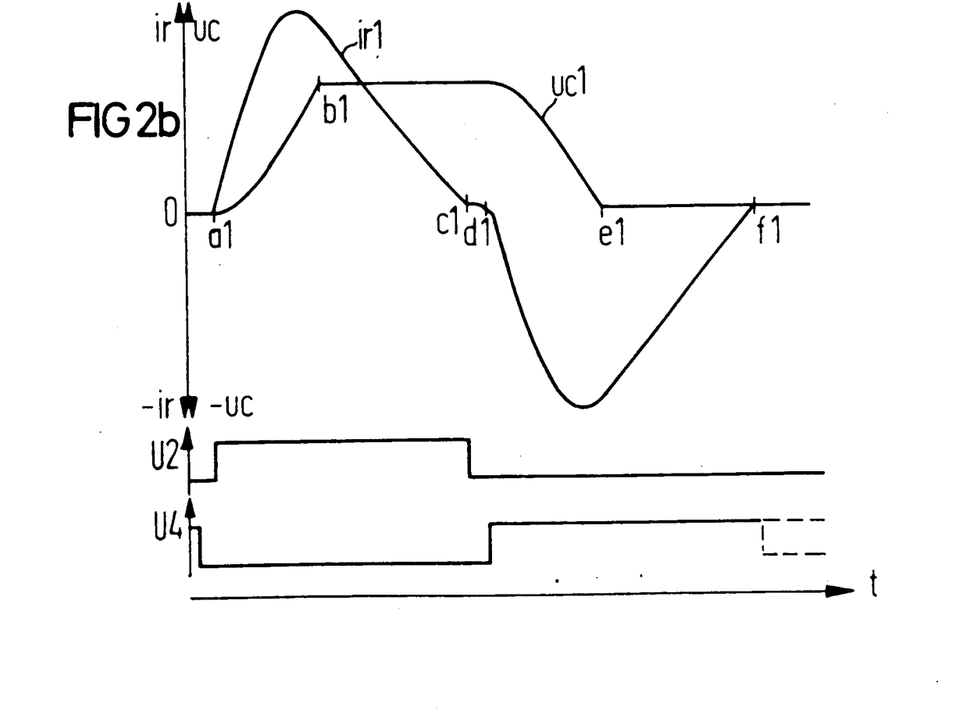
Figure 2C:
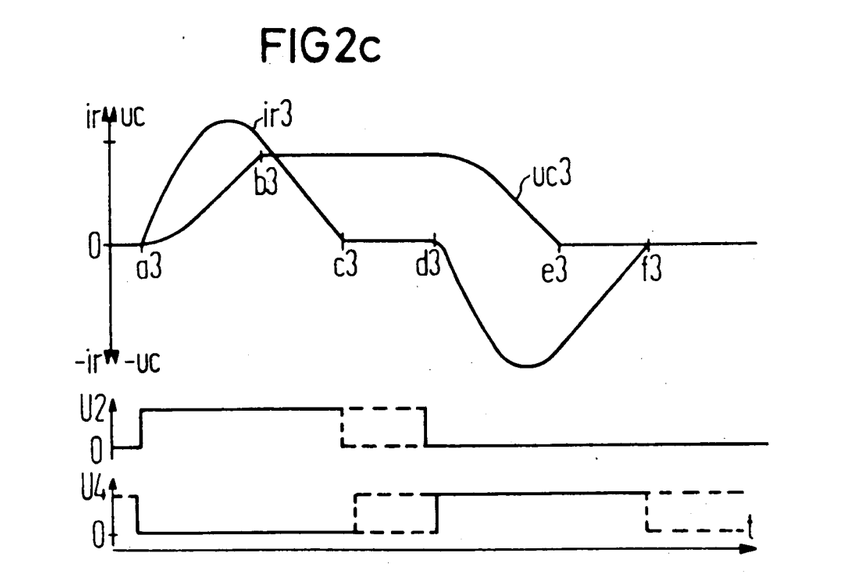

Since the level of the current ir in the resonant circuit, at which a recovery diode D1 or D2 becomes conducting, increases with increasing input voltage Ui, Oi, but the linear decrease in current remains constant regardless of the input voltage, the current pulse duration, that is the period of time from a time a0, a1 or a3 to a time c0, c1 or c3 in FIGS. 2a, 2b and 2c, rises with increasing input voltage Ui, Oi.

Methods according to the invention are based on the fact that the off-duty cycles of the semiconductor switches Q1 and Q2 are controlled as a function of the input voltage Ui, Oi, while the duty cycles are typically determined by a regulating circuit for regulating the output voltage Uo, and moreover a turn-on pulse predetermined by this control circuit is prevented from being effective at the semiconductor switch as long as a turning on of one of the semiconductor switches Q1 or Q2 initiated by the preceding turn-on pulse of the control circuit, is not yet followed by a turn-off. In other words, the turn-on pulse repetition rate is set by a control circuit, but the maximum allowable turn-on pulse repetition rate can at most be controlled as a function of the input voltage Ui, Oi.

There are three basic methods for triggering semiconductor switches in a half-bridge circuit, such as the semiconductor switches Q1 and Q2 of FIG. 1.

Variant 1 provides that in alternation, one semiconductor switch, for instance Q, is switched on as a function of a turn-on pulse predetermined by the control circuit, after a certain period of time is switched off again as a function of the input voltage Ui, Oi, and then, likewise as a function of a turn-on pulse predetermined by the control circuit, the other semiconductor switch is switched on and switched off again as a function of the input voltage Ui, Oi.

Variant 2 provides that one of the semiconductor switches, for instance Q1, is switched on first as a function of a turn-on pulse predetermined by the control circuit, is switched off again as a function of the input voltage Ui, Oi, then after the switching off of this semiconductor switch, the other semiconductor switch is switched on immediately and then shut off again after the same length of time for which the previously switched-on semiconductor switch was on, and that switching the next time is again initiated by the control circuit. In other words, one full current wave is transmitted each time, and intervals can be provided by the regulating means only between full current waves.

Variant 3 is similar to variant 2, but it provides a fixed-logic interlock of the trigger voltage of the two semiconductor switches Q and Q2 which assures that the second semiconductor switch Q2, for instance, is always conducting whenever the first semiconductor switch Q1 blocks, and vice versa.

In all three variants, provision must be made to assure that the switch Q2 will remain on for at least as long as the switch Q1 had remained on previously. In order to avoid a short circuit, the two switches Q1 and Q2 must also never be allowed to conduct simultaneously.

In FIG. 2a, the course of the current ir in the resonant circuit of a switching power supply of FIG. 1 for a time t is shown in the form of a curve ir0, for the case in which the lowest allowable input voltage Uimin between the input potentials Ui and Oi is applied. The circuit is dimensioned in such a way that at this lowest allowable input voltage Uimin, the recovery diodes D1 and D2 just barely still do enter the conducting state. In other words, they clamp the resonant circuit to the ground potentials.

This is not mandatory for the function of a resonant converter of this kind, but it does furnish a higher power yield than if it were purely sinusoidal. A curve uc0 in FIG. 2a shows the resultant course of the voltage uc over the capacitor Cr of the resonant circuit. The level U2 represents the required trigger level at the control input of the first semiconductor switch Q1, that is the level between the terminal 2 and the node 3. The level U4 indicates the required trigger level at the control input of the second semiconductor switch Q2. Before U2 can be allowed to be switched to the high level, U4 must be switched to the low level. The idle time between the trailing edge of U4 and the leading edge of U2 and also between the trailing edge of U2 and the leading edge of U4, is mandatory in order to assure that no short circuiting will take place. Its duration is quite small and is dependent on the switching behavior of the semiconductor switches Q1 and Q2 being used.

At a time a0, the first semiconductor switch Q1 is switched on by a high level of U2. The capacitor Cr is charged and the voltage uc increases. The current ir in the resonant circuit exhibits a sinusoidal course until a time b0. At the time b0, the recovery diodes become conducting and thus clamp the capacitor Cr, so that it is not charged further. From the time b0 on, the voltage uc at the capacitor Cr accordingly remains largely constant, and the resonant circuit current ir drops linearly until at a time c0 it is virtually 0. At this time c0, the natural current pulse duration is ended, and the semiconductor switch Q can be switched off without loss.

In both FIGS. 2a and 2b, the current ir and the voltage uc are shown for the case in which either a triggering method of variant 2 or 3 is involved as described above, or the resonant converter is operating at full load and therefore immediately switches on the second semiconductor switch, in this case Q2, after the shutoff of the first semiconductor switch, in this case Q1. At the time c0, the trigger voltage U2 is therefore switched to low level, and after a brief idle time, at the time b0, the triggering voltage U4 is switched to high level. From a time d0 on, the current ir in the resonant circuit increases with an opposite algebraic sign (+or −) with a sinusoidal course, and the voltage uc across the capacitor Cr drops, describing the same course as already exhibited during charging. If at a time e0 the capacitor has been discharged and the voltage uc has dropped to zero, then the current ir flows across the recovery diode once again and has a linear course as before, but with the opposite algebraic sign, until at a time f0 it becomes zero. The second semiconductor switch Q2 can be switched off without edge losses, by switching the trigger level U4 to low potential, no earlier than a time f0. U4 need not already have been switched to low potential at a time f0, but it must be switched to low potential in good time before U2 is switched back to high potential. The range in which the level U4 is not of crucial importance is therefore shown in dashed lines.

FIG. 2b shows the same subject matter, but for the case where a higher input voltage Ui is fed in. A comparison of FIG. 2a with 2b shows that at a higher input voltage Ui, a time b1 at which the recovery diode keeps the voltage Uc across the capacitor Cr constant arrives sooner than a time b0 at a lower input voltage, but because of the subsequent linear course of the current ir in the resonant circuit, which begins at a higher absolute value, the time between the beginning a1 of the natural current pulse duration and an end c1 of the natural current pulse duration is longer than the natural current pulse duration between the time a0 and the time c0 at a lower input voltage.

FIG. 2c shows a curve ir3 of the course of the current ir in the resonant circuit, and a curve uc3 for the course of the voltage uc across the capacitor Cr, under the same conditions as those shown in FIG. 2a, but for the case of triggering according to the variant 1, in which the second semiconductor switch Q2 is not switched on immediately after the shutoff of the first semiconductor switch Q1, or in other words the time from a time c3 of the zero crossover of the current until the switching on of the second semiconductor switch Q2 at a time d3 is longer than the idle time required for safety reasons. During this period, the course of the signal of the trigger levels U2 and U4 is largely arbitrary, although U2 must be switched to the low level before U4 is switched to the high level.

In order to attain a good utilization factor of the power components of a resonant converter switching power supply being triggered according to the invention, it is mandatory that the interval between the shutoff of the first semiconductor switch and the switching on of the second semiconductor switch be as short as possible at the lowest allowable input voltage Uimin, so that the load-dependent regulation can clock the resonant converter with the highest possible frequency. At a relatively high input voltage, as shown in FIG. 2b, the natural current pulse duration increases, so that even with an immediate switchover between the two semiconductor switches Q1 and Q2, a lower clock frequency would be attained. However, in order to transmit the same power from the primary side of the resonant converter to the secondary side as with immediate switchover between the two semiconductor switches Q1 and Q2 at the lowest allowable input voltage Uimin, an even lower clock frequency is required if the input voltage Ui is higher.

For a power P converted at the capacitor Cr, the following equation applies:

$$P = \tfrac{1}{4} \cdot Ui^2 \cdot Cr \cdot f$$

where f is the frequency. If Uimin represents the minimum allowable input voltage, then for the frequency f that is required in order to transmit the same power at an arbitrary (allowable) input voltage Ui as in the case of a minimum allowable input voltage Uimin and with immediate switchover of the semiconductor switches Q1 and Q2, the following maximum frequency results:

$$f = f\mathrm{max} \cdot \frac{(Uimin)^2}{Ui}$$

This equation shows that for converting the same power, the required repetition rate of trigger pulses becomes lower with increasing input voltage Ui, in fact by the square of the ratio of the voltage Ui to the minimum allowable input voltage Uimin.

It can be seen from FIGS. 2a and 2b that the natural current pulse duration becomes greater with increasing input voltage, by a linear relationship. Therefore, in an input-voltage-dependent control of the duty cycles of the semiconductor switches Q1 and Q2, only the case of the minimum allowable input voltage Uimin is critical. Only in this case is it mandatory for the duration of the trigger pulses to be matched to the natural current pulse duration, or in other words for a trigger pulse in FIG. 2 at the time c (c0, c1, c3) or at the time f (f0, f1, f3) to be ended. At a higher input voltage Ui, in order to attain the same efficiency, the duration of the trigger pulses is arbitrary, if they are between the natural current pulse duration at this input voltage Ui and a time that deviates, by a factor formed of the square of the ratio of the actual input voltage Ui to the minimum allowable input voltage Uimin, from the natural current pulse duration at the minimum allowable input voltage Uimin.

Figure 3:
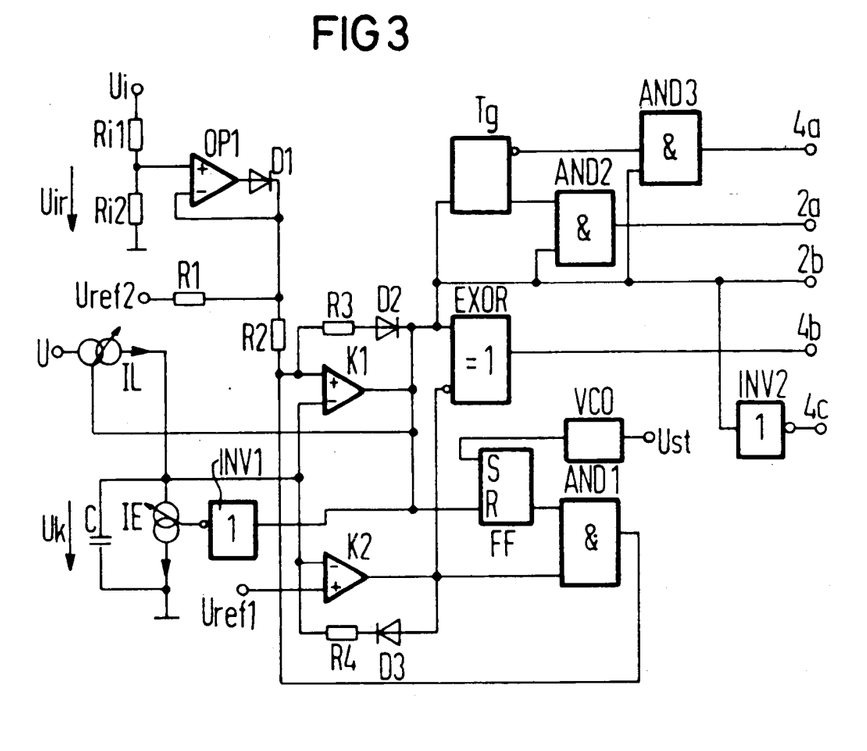
FIG. 3 is a schematic and block circuit diagram of an exemplary embodiment of a possible control circuit for performing methods according to the invention, which acts as a function of the input voltage Ui, Oi to form trigger pulses for the semiconductor switches from pulses influenced by a regulating circuit, and has output signals for three different modes of operation of resonant converter switching power supplies.

FIG. 3 shows one possible embodiment of a trigger circuit for performing methods according to the invention. It should be noted in this case that one skilled in the art will be familiar with an arbitrary amount of variants of such trigger circuits, which make it possible to perform methods according to the invention with an awareness of the invention.

FIG. 3 shows a series circuit of two resistors Ri1 and Ri2, in which a terminal of the resistor Ri1 is acted upon by the input potential Ui, and a terminal of the resistor Ri2 is connected to ground potential, for instance the input ground potential Oi. A mode point of these resistors Ri1 and Ri2 is connected to the non-inverting input of an operational amplifier OP1. The output of this operational amplifier OP1 is fed back to its inverting input through a diode being connected in the conducting direction. The inverting input of the operational amplifier OP1 is also connected to an upper reference potential Uref2 through a resistor R1, and to the non-inverting input of a comparator K1, through a further resistor R2. This non-inverting input of the comparator K1 is also connected to the output of a first AND gate AND1, as well as through a series circuit of a resistor R3 and a diode D2 being polarized in the conducting direction, to the output of the comparator K1. The inverting input of the comparator K1 is connected to the inverting input of an operational amplifier K2, to the current output of a current source IL, to the current input of a current sink IE and to one terminal of a capacitor C. The other terminal of the current path of the current sink IE and the other terminal of the capacitor C are connected to ground potential. The other terminal of the current path of the current source IL is connected to a supply potential U. The current source IL is constructed as a switchable constant current source. Its control input is connected to the output of the comparator K1. The current sink IE is constructed as a switchable constant current sink. Its control input is connected to the output of a first inverter circuit INV1 which has an input that is connected with the output of the comparator K1. The output of the comparator K1 is also carried to an output terminal 2b, to the reset input R of an RS flip-flop FF, to the input of a bistable multivibrator which will be referred to below as a toggle Tg, to the input of a second inverter circuit INV2, to an input of an EXCLUSIVE-OR gate EXOR, and to one input of each of a second and a third AND gate AND2 and AND3. The setting input S of the RS flip-flop FF is triggered by an oscillator VCO, having a frequency which is controllable by a control voltage Ust. The non-inverting input of the operational amplifier K2 is acted upon by a lower reference voltage Uref1. The output of this operational amplifier K2 is connected to its inverting input through a series circuit of a diode D3 being connected in the conducting direction and a resistor R4. The output of this operational amplifier K2 is also connected to an input of the aforementioned EXCLUSIVE-OR gate EXOR which passes on the signal in inverted form, and to one input of the first AND gate AND1. The other input of the AND gate AND1 is connected with the output of the RS flip-flop FF. The output of the inverter INV2 forms an output terminal 4c, the output of the EXCLUSIVE-OR gate EXOR forms an output terminal 4b, the output of the AND gate AND2 forms an output terminal 2a, and the output of the AND gate AND3 forms an output terminal 4a. One input of the AND gate AND2 is connected to the output of the toggle Tg furnishing the non-inverted output signal. The output of the toggle Tg furnishing the inverted output signal is connected with one input of the AND gate AND3.

The circuit described above varies the duration of control pulses furnishes at its output terminal as a function of the input voltage Ui.

A control voltage Uir is established at the non-inverting input of the operational amplifier OPI as a function of the input voltage Ui, through the voltage divider Ri1, Ri2. The operational amplifier OPI operates as a voltage repeater or follower, with a diode in a feedback branch, and it raises the potential at a connecting node between the resistors R1 and R2 beyond the value usually defined by the upper reference potential Uref2, as soon as the control voltage Uir exceeds a certain value and the output of the comparator K1 is at high potential, or in other words as soon as the diode D2 blocks and the first AND gate AND1 furnishes a low level. In this connection it should be noted that in terms of circuitry, the output of the first AND gate AND1 is constructed, for instance, by a diode which is polarized in the conducting direction, in such a way that a low level at the output of the AND gate AND1 has no effect on the potential at the non-inverting input of the comparator K1.

In the initial state of the circuit, the output of the comparator K1 is at a low level, and accordingly the constant current sink IE is switched on, and the operational amplifier K2, which in this case is a differential amplifier with a defined voltage amplification, furnishes a high signal in such a way that just enough current reaches the current sink IE through the diode D3 and the resistor R4 for the voltage Uk across the capacitor C to be kept constant, for example at Uref1. Thus the starting condition for the capacitor C is firmly defined and constant. Instead of the operational amplifier K2 with a diode feedback branch, a second comparator could also be used, which switches off the switchable constant current sink IE when the lower reference potential is attained. This could be achieved by providing that the output signal of this comparator K2, like the output signal of the first comparator K1 is inverted and the inverted output signals of the two comparators are provided as input variables for a further AND gate, with this AND gate furnishing the control variable for the switchable constant current sink IE.

By briefly raising the potential at the non-inverting input of the comparator K1 above the lower reference potential Uref1, charging of the capacitor C is initiated. A high level at the output of the AND gate AND1 causes such raising of the potential. Since the output of the comparator K1 was at the low level, the RS flip-flop FF was reset, and the reset input R was no longer blocked. A trigger pulse, which was emitted by the oscillator VCO in this exemplary embodiment as a function of the secondary voltage regulation, was able to set the RS flip-flop FF and thus apply a high potential to one input of the AND gate AND1. The other input of the AND gate AND1 was enabled through the high signal at the output of the operational amplifier K2. For a circuit as described, it is sufficient for the oscillator VCO to emit very brief pulses, but in each case the pulses of the VCO should be shorter than the shortest allowable duty cycle of a semiconductor switch Q1 or Q2. Since the trigger pulses of the oscillator VCO are stored in the RS flip-flop, it is permissible for them to arrive unsynchronized, at arbitrary times. They are synchronized with the switching state of the operational amplifier K2 through the AND gate AND1. The AND gate AND1 does not emit a stored trigger pulse to the non-inverting input of the comparator K1 until the output level of the comparator K2 is high, which is not the case until after the termination of any charging-/discharging cycle of the capacitor C that may have just elapsed.

If the potential at the non-inverting input of the comparator K1 is raised above the lower reference potential, then the output of the comparator K1 connects a high potential to the control input of the switchable constant current source IL, and the controllable constant current sink IE is blocked through the inverter INV1. As a result, the capacitor C is charged and a voltage Uk rises up to the potential that is set either through the upper reference potential Uref2 or by the control voltage Uir. The RS flip-flop FF is also reset.

A time tr that is needed at the capacitor C to go from a minimum voltage value Ukmin to the maximum voltage value Ukmax, can be defined as follows:

$$tr = \frac{U\text{kmax} - U\text{kmin}}{C \cdot IL}$$

After reaching the maximum voltage Ukmax at the capacitor C, which is predetermined either by the upper reference potential Uref2 or the control voltage Uir, the comparator K1 switches over. The time tr is thus identical to the time during which a high level is present at the output terminal 2b. The time tr is proportional to the input voltage Ui in such a circuit, as soon as the input voltage Ui exceeds a value predetermined by the ratio of the resistors Ri1 and Ri2 and by the upper reference potential Uref2. If the voltage Uk attains the potential value at the non-inverting input of the comparator K1, then the comparator K1 switches to a low level at its output. The joint coupling provided by the resistor R3 and the diode D2 assures a clean switchover. The ratio of the resistances R1 or R2 to R3 should be dimensioned in such a way that at the maximum allowable input voltage Ui, the level at the non-inverting input of the comparator K1 is dropped below the value of the lower reference potential Uref1 by the resultant joint coupling. A low level at the output of the comparator K1 switches off the switchable constant current source IL and it switches on the constant current sink IE through the inverter INV1. The capacitor C is discharged by the current of the constant current sink IE and the voltage Uk drops from the value Ukmax to the value Ukmin. A time tf needed to proceed at the capacitor C from the maximum voltage value Ukmax to the minimum voltage value Ukmin can be defined as follows:

$$tf = \frac{U\text{kmax} - U\text{kmin}}{C \cdot IE}$$

The rise time tr of the voltage Uk across the capacitor C is thus inversely proportional to the magnitude of the charge current of the constant current source IL. The discharge time tf is inversely proportional to the magnitude of the discharge current of the constant current sink IE. Depending on whether only the output variable of the comparator K1 or the output variable of the operational amplifier K2 as well is used to fix the turn-on pulse duration, and depending on whether a trigger circuit variant 1, 2 or 3 is used, it is appropriate to make the charge current of the constant current source IL of equal magnitude to the discharge current of the constant current sink IE, or to select a very low charge current of the constant current source IL as compared with the discharge current of the constant current source IE.

The voltage Uk across the capacitor C drops linearly until it reaches the lower reference potential Uref1. Upon reaching the lower reference potential Uref1, the output of the operational amplifier K2 switches to high potential. The operational amplifier K2 is negatively fed back through the resistor R4 and the diode D3. The resistor R4 is dimensioned in such a way that with a high level at the output of the operational amplifier K2, the current flowing through the diode D3 and the resistor R4 is precisely as high as the current of the constant current source IE. As a result the voltage Uk is firmly kept at a constant lower value Ukmin, so that the initial condition for the next charging operation of the capacitor is defined and constant. In a trigger circuit according to FIG. 3, both the charge time tr and the discharge time tf of the capacitor C are varied as soon as the input voltage UI exceeds a value set by the upper reference potential Uref2. This variation in the charge time tr or discharge time tf is then linearly dependent on the input voltage Ui, in the circuit shown in FIG. 3. Since the charge and discharge time of the capacitor C is set by the upper reference potential Uref2 at input voltages that are below a predetermined minimum allowable input voltage Ui, which can be set through the upper reference potential Uref2, then for a slow rise in the input voltage Ui, for instance after the circuit is put into operation, it is also assured that inappropriately brief turn-on pulses will not be generated, and the interlocking RS flip-flop FF and the first AND gate AND1 assures that one turn-on pulse will not be followed by the next until the first one is ended.

The essence of the circuit configuration shown in FIG. 3 can be seen in the fact that the charge time tr or the discharge time tf can be varied as a function of the input voltage Ui. It is self evident that not only the circuit configuration having an operational amplifier OP1 and a diode D1 are conceivable for coupling-in the input voltage Ui. Other possibilities are also conceivable for generating a time base as the charging and discharging time of a capacitor.

The decision as to whether only the charge time tr of the capacitor C, or the discharge time tf as well is used for generating turn-on pulses for semiconductor switches, is up to the judgement of the user and is dependent on the trigger variant, among other factors. FIG. 3 shows various operations. Since the preparation of the signals furnished at the terminals 2a, 2b, 4a, 4b and 4c is easily accomplished by one skilled in the art with the aid of the logic elements EXOR, Tg, INV2, AND2 and AND3, the ensuing discussion will merely explain how the signals furnished at the various output terminals can appropriately be used.

The signal at the terminal 2a can be used as a basis for the control voltage U2 to achieve the triggering variant 1. In that case, the signal at the output terminal 4a can be used as a basis for the control voltage U4. During the charge time tr, high potential is present at the terminal 2a and low potential at the terminal '4a. During the ensuing charge time tf, a low level is present at both the terminal 2a and the terminal 4a. During the charge time tr which follows that, a high level is present at the terminal 4a, while a low level is present at the terminal 2a. During the then-ensuing discharge time tf of the capacitor C as well, the signals at both of the terminals are again at a low level.

In such a circuit, the charge time tr of the capacitor C determines the duty cycle of both the first and second semiconductor switches Q1 and Q2, while the discharge time tf is used for setting the idle time, which must be brief for safety reasons. For this purpose it is appropriate for the discharge current of the switchable constant current sink IE to be high compared with the charge current of the switchable constant current source IL. The charge time is adjustable by the current of the switchable constant current source IL. The discharge time is adjustable by the current of the switchable constant current sink IE. The fact that the idle time becomes longer with an increasing input voltage Ui is no problem, because the maximum turn-on pulse repetition rate is mandatory at the lowest allowable input voltage.

In order to attain the triggering variant 2, the signal at the terminal 2b can form the basis for the trigger signal U2 of the first semiconductor switch Q1, and the signal at the terminal 4b can be used as the basis for the trigger signal U4 of the second semiconductor switch Q2. Then the semiconductor switch Q1 is conducting during the charge time tr, while the semiconductor switch Q2 is conducting during the discharge time tf. The charge time tr must not be longer than the discharge time ft. Appropriately, the charge time should be precisely as long as the discharge time.

In order to achieve the triggering variant 3, the signal at terminal 2b can furnish the basis for the trigger signal U2, and the signal which is inverted with respect thereto at the terminal 4c can be used as the basis for the signal U4. As a result, during the charge time tr the semiconductor switch Q1 is conducting and the semiconductor switch Q2 blocks, while otherwise the semiconductor switch Q2 is conducting and the semiconductor switch Q1 blocks. Once again, the discharge time should be at least as long as the charge time of the capacitor C, in order to assure that no residual energy will remain in the transformer T of the resonant converter. An idle time between the switchover operations may be achieved, in this variant and the one before it, by means of a delay element, among other possible provisions.

Figure 4:
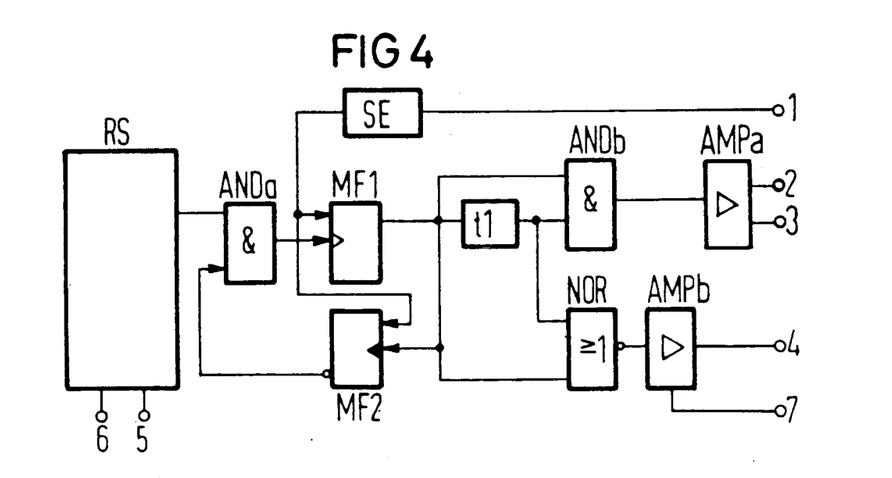
FIG. 4 is a block circuit diagram of another possible circuit configuration for performing methods according to the invention.

The terminals 2a, 2b, 4a 4b and 4c naturally do not furnish the trigger signals for the semiconductor switches Q1 and Q2 directly. Typically, an amplifier circuit or at least a level converter circuit is provided, usually with an inductive transformer or an optical coupler. FIG. 4 shows another embodiment of a trigger circuit for performing the method according to the invention, in the form of a block circuit diagram.

FIG. 4 shows a regulating circuit RS with input terminals 5 and 6 and an output terminal, which is connected with one input of an AND gate ANDa. The output of the AND gate ANDa is connected with the signal input of a monostable multivibrator MF1, being triggered at the leading edge and having an adjustable time constant. The output of the monostable multivibrator MF1 is connected to the input of a further AND gate ANDb, to the input of a delay element t1, to the input of a NOR gate NOR, and to the signal input of a monostable multivibrator MF2 that is triggered at the trailing edge and has an adjustable time constant. This monostable multivibrator MF2 being triggered at the trailing edge has an output which furnishes the inverted signal that is connected to a further input of the AND gate ANDa being triggered by the regulating circuit RS. The output of the delay element t1 is connected to a further input of the AND gate ANDb being triggered by the monostable multivibrator MF1 which is triggered at the leading edge, and is also connected to a further input of the NOR gate NOR. The output of the NOR gate NOR is connected with the input of a driver circuit AMPb, having an output which is connected to output terminals 4 and 7. The output of the AND gate ANDb being triggered by the delay element t1 is connected to the input of a further driver circuit AMPa, having an output which forms the output terminals 2 and 3. The input terminal 1 is connected to a control unit SE, which varies the time constant of the two monostable multivibrators MF1 and MF2 as a function of the input voltage Ui present at the input terminal 1. The output of this control unit SE is therefore connected to the respective control inputs of the two monostable multivibrator circuits MF1 and MF2. In the various drawing figures, the same or similar reference numerals represent identical or similar circuit elements or variables.

The regulating circuit detects the output voltage of a resonant converter switching power supply of FIG. 1 through the input terminals 5 and 6. The regulating circuit resonant converter applies control pulses to the input of the AND gate ANDa as a function of this output voltage. If the inverted output signal of the monostable multivibrator MF2 being triggered at the trailing edge is at the high level, then a control pulse of the regulating circuit RS is switched by the AND gate ANDa to the signal input of the monostable multivibrator MF1 being triggered at the leading edge. The output of this monostable multivibrator is switched to the higher level for the duration of the monostable multivibrator time constant. The driver circuit AMPb is triggered with a low level through the NOR gate NOR. Once the time constant of the delay element t1 has elapsed, the driver AMPa is triggered with a high signal through the AND gate ANDb. After the time constant of the monostable multivibrator being triggered at the leading edge has elapsed, the driver AMPa is triggered with a low level through the AND gate ANDb, and after the time constant of the delay element t1 has elapsed, the driver AMPb is triggered with a high level through the NOR gate NOR. In addition, the monostable multivibrator MF2 is triggered with the trailing edge at the output of the monostable multivibrator MF1, and this monostable multivibrator MF2 switches a low level to the AND gate ANDa for the switching duration of its monostable multivibrator time constant, so that a further turn-on pulse is suppressed for the length of the monostable multivibrator time constant of the monostable multivibrator MF2.

A circuit configuration of this kind enables a triggering of the semiconductor switches Q1 and Q2 of FIG. 1 according to the aforementioned variant 3, through the output terminals 2, 3, 4 and 7. To this end, the time constants of the two monostable multivibrators MF1 and MF2, which respectively define the duty cycle of the two semiconductor switches Q1 and Q2, should be of equal length. The idle time between the switchovers of the various semiconductor switches Q1 and Q2 is adjusted by the delay element t1.

I claim:

1. Method for controlling a push-pull series resonant converter switching power supply including:
an inductive transformer with a primary winding and at least one secondary winding, two semiconductor switches being interconnected at a circuit node and connected in a half-bridge circuit between an input potential and an input ground potential, a series-resonant circuit connected between the connecting node and the input ground potential including a capacitor with terminals and an inductor connected in series with the primary winding of the transformer, diodes connected between the input potential and the input ground potential for preventing a potential at one of the terminals of the capacitor not being acted upon by the input potential or the input ground potential from significantly exceeding or dropping below the respective input potential or the input ground potential, a rectifier connected to the secondary side of the transformer for rectifying a secondary voltage of the transformer, the rectifier having an output supplying an output voltage between an output terminal and an output ground terminal, a smoothing capacitor connected between the output terminal and the output ground terminal to be connected in parallel to a load, and a control circuit triggering the two semiconductor switches with turn-on pulses for regulating the output voltage to a constant value as a function of the load by variation of a turn-on pulse repetition rate, which comprises controlling a maximum allowable repetition rate of the turn-on pulses and the duration of the turn-on pulses as a function of the input potential.

2. Method according to claim 1, which comprises controlling the maximum allowable repetition rate of turn-on pulses and the duration of the turn-on pulses as a function of the input potential, only after a predetermined value of the input potential is exceeded.

3. Method according to claim 1, which comprises setting the duration of the turn-on pulses at a minimum allowable input potential as closely equivalent to the natural current pulse duration in the primary winding of the transformer as possible, and limiting the repetition rate of the turn-on pulses by preventing a turn-on pulse from beginning until the end of a preceding turn-on pulse.

4. Method according to claim 3, which comprises setting the duration of the turn-on pulses as closely equivalent to the natural current pulse duration in the primary winding of the transformer as possible only at a minimum allowable input potential, and setting the duration of the turn-on pulses at an input potential greater than the minimum allowable input potential to be longer than the natural current pulse duration in the primary winding of the transformer, but at most greater than the duration of the turn-on pulses at a minimum allowable input potential by a factor being formed from the square of the ratio of the actual input potential to the minimum allowable input potential.

5. Method for controlling a push-pull series resonant converter switching power supply including:

an inductive transformer with a primary winding and at least one secondary winding, two semiconductor switches being interconnected at a circuit node and connected in a half-bridge circuit between an input potential and an input ground potential, a series-resonant circuit connected between the connecting node and the input ground potential including a capacitor and an inductor connected in series with the primary winding of the transformer, diodes connected between the input potential and the input ground potential for preventing a potential at the capacitor from significantly exceeding the input potential, an output connected to the secondary winding of the transformer for supplying an output voltage, and a control circuit triggering the two semiconductor switches with turn-on pulses for regulating the output voltage to a constant value as a function of a load to be connected to the output by variation of a turn-on pulse repetition rate, which comprises controlling a maximum allowable repetition rate of the turn-on pulses and the duration of the turn-on pulses as a function of the input potential.

* * * * *